United States Patent
Paterson, Jr. et al.

(10) Patent No.: US 11,591,197 B2
(45) Date of Patent: Feb. 28, 2023

(54) LOAD HANDLING MODULE FOR A MATERIAL HANDLING VEHICLE

(71) Applicant: The Raymond Corporation, Greene, NY (US)

(72) Inventors: Robert J. Paterson, Jr., Binghamton, NY (US); Erik C. Tracy, Johnson City, NY (US)

(73) Assignee: The Raymond Corporation, Greene, NY (US)

( * ) Notice: Subject to any disclaimer, the term of this patent is extended or adjusted under 35 U.S.C. 154(b) by 282 days.

(21) Appl. No.: 16/838,833

(22) Filed: Apr. 2, 2020

(65) Prior Publication Data
US 2020/0317483 A1 Oct. 8, 2020

Related U.S. Application Data

(60) Provisional application No. 62/830,155, filed on Apr. 5, 2019.

(51) Int. Cl.
| | |
|---|---|
| *B66F 9/075* | (2006.01) |
| *B66F 9/06* | (2006.01) |
| *B66F 9/14* | (2006.01) |

(52) U.S. Cl.
CPC ............ *B66F 9/0755* (2013.01); *B66F 9/063* (2013.01); *B66F 9/144* (2013.01)

(58) Field of Classification Search
CPC ................................ B66F 9/0755; B66F 9/063
See application file for complete search history.

(56) References Cited

U.S. PATENT DOCUMENTS

| | | | |
|---|---|---|---|
| 7,010,404 B2 | 3/2006 | Ichijo | |
| 8,538,577 B2 | 9/2013 | Bell | |
| 9,828,223 B2 | 11/2017 | Svensson | |
| 10,138,101 B2 * | 11/2018 | Svensson | B66F 9/0755 |
| 2014/0009612 A1 * | 1/2014 | King | G06V 10/17 |
| | | | 348/143 |

(Continued)

FOREIGN PATENT DOCUMENTS

| | | | | |
|---|---|---|---|---|
| CA | 3077881 A1 * | 10/2020 | ............. | B66F 9/063 |
| CN | 111332996 A * | 6/2020 | ............. | B66F 17/00 |

(Continued)

OTHER PUBLICATIONS

European Patent Office. Extended European Search Report and Written Opinion for application 20167975.0, dated Sep. 3, 2020.

*Primary Examiner* — Kaitlin S Joerger
(74) *Attorney, Agent, or Firm* — Quarles & Brady LLP

(57) ABSTRACT

A load handling module for a material handling vehicle can include a first camera configured to determine the position of an object in a first camera field of view, and a second camera positioned above the first camera and configured to determine the position of an object in a second camera field of view. A fork tip sensor can be secured to at least one fork proximate the tip end thereof, and can be configured to detect the presence of an object within a fork sensor field of view extending in front of the fork. A controller can be in communication with the first sensor, the second sensor, and the fork tip sensor, the controller being configured to autonomously control the material handling vehicle to pick up or drop-off a load.

19 Claims, 11 Drawing Sheets

(56) References Cited

U.S. PATENT DOCUMENTS

| | | | |
|---|---|---|---|
| 2016/0090284 A1* | 3/2016 | Svensson | B66F 9/0755 |
| | | | 701/50 |
| 2016/0090285 A1* | 3/2016 | Svensson | B66F 9/24 |
| | | | 700/300 |
| 2018/0081369 A1* | 3/2018 | Fischer | G05D 1/024 |
| 2018/0293743 A1* | 10/2018 | Iida | G05D 1/0246 |
| 2020/0299117 A1* | 9/2020 | Sperlich | B60W 30/18009 |
| 2020/0377350 A1* | 12/2020 | Nonogaki | B66F 9/063 |

FOREIGN PATENT DOCUMENTS

| | | | | | |
|---|---|---|---|---|---|
| DE | 102012108028 | A1 | * | 10/2013 | ............ B66F 9/0755 |
| DE | 102013112016 | A1 | * | 4/2015 | ............ B66F 9/0755 |
| DE | 102019113606 | A1 | * | 11/2020 | ............ B66F 9/0755 |
| EP | 2468678 | B1 | | 6/2012 | |
| EP | 2653429 | A1 | * | 10/2013 | ............ B66F 9/0755 |
| EP | 2653429 | B1 | | 10/2013 | |
| EP | 2653430 | A1 | | 10/2013 | |
| EP | 3000772 | A1 | * | 3/2016 | ............... B66F 9/07 |
| EP | 3000772 | A1 | | 3/2016 | |
| EP | 3323770 | A1 | | 5/2018 | |
| EP | 3597587 | A1 | * | 1/2020 | ............... B66F 9/10 |
| EP | 3718951 | A1 | * | 10/2020 | ............. B66F 9/063 |
| WO | WO-2016181733 | A1 | * | 11/2016 | ............. B66F 9/063 |

\* cited by examiner

LOAD HANDLING MODULE FOR A MATERIAL HANDLING VEHICLE

CROSS-REFERENCE TO RELATED APPLICATIONS

The present application is based on and claims priority to United States Provisional Patent Application No. 62/830,155, filed on Apr. 5, 2019, and entitled "Load Handling Module for a Material Handling Vehicle."

STATEMENT REGARDING FEDERALLY SPONSORED RESEARCH

Not applicable.

FIELD OF THE INVENTION

The present invention relates to the field of material handling vehicles, and more specifically, to autonomous control systems for material handling vehicles.

BACKGROUND OF THE INVENTION

Material handling vehicles can be found in warehouses, factories, shipping yards, and, generally, wherever pallets, large packages, or loads of goods are required to be transported from place to place. Material handling vehicles typically include load supporting members or forks for lifting packages or pallets. Material handling vehicles may be designed to include sensing features that allow them to be an automatic guided vehicle (AGV). An AGV may be programmed to store travel routes and include a control system, which is integrated with the drive, steering, and braking systems for the vehicle.

SUMMARY OF THE INVENTION

Embodiments of the present disclosure provide systems and methods that include a load handling module for autonomously loading and unloading a load.

In one aspect, the present disclosure provides a load handling module for a material handling vehicle. The material handling vehicle may include a vehicle body, a mast, a tower, and at least one fork extending from a load backrest to a tip end. The tower may extend upwardly from the load backrest, and the at least one fork may be selectively movable relative to the vehicle body and configured to support a load. The load handling module may comprise a first camera secured to the load backrest and positioned proximate a top surface of the at least one fork, the first camera being configured to determine a position of an object in a first camera field of view. A second camera can be secured to the tower so that it is positioned above the first camera. Further, the second camera can be configured to determine the position of an object in a second camera field of view. The load handling module may further comprise a fork tip sensor secured to the at least one fork proximate a tip end, the fork tip sensor being configured to detect a presence of an object within a fork sensor field of view extending in front of the tip end. Furthermore, a controller may be in communication with the first camera, the second camera, and the fork tip sensor, and the controller may be configured to autonomously control movement of the at least one fork.

In another aspect, the present disclosure provides a method for picking up a load with a material handling vehicle. The material handling vehicle may include at least one fork extending from a load backrest, a mast, a tower extending upwardly from the load backrest, a first camera mounted to the load backrest, a second camera mounted to the tower, and a fork tip sensor disposed proximate a tip of the at least one fork. The method may comprise moving the material handling vehicle to a pick up location, identifying, with the first camera, a pallet the load is resting on, and aligning the at least one fork with the pallet. Further, the method may comprise extending the forks to engage the pallet, and lifting and retracting forks to pick up the load with the fork.

In another aspect, the present disclosure provides a method for dropping off a load supported by a material handling vehicle. The material handling vehicle may include at least one fork extending from a load backrest, a mast, a tower extending upwardly from the load backrest, a first camera mounted to the load backrest, a second camera mounted to the tower, and a fork tip sensor disposed proximate a tip of the at least one fork. The method may comprise moving the material handling vehicle to a drop-off location, determining if the drop-off location is vacant, and extending the forks to move the load into the drop-off location. Further, the method may comprise lowering the forks to place the load in the drop-off location, retracting the forks to disengage the load, and verifying that a position of the load is within predefined tolerance of the drop-off location.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
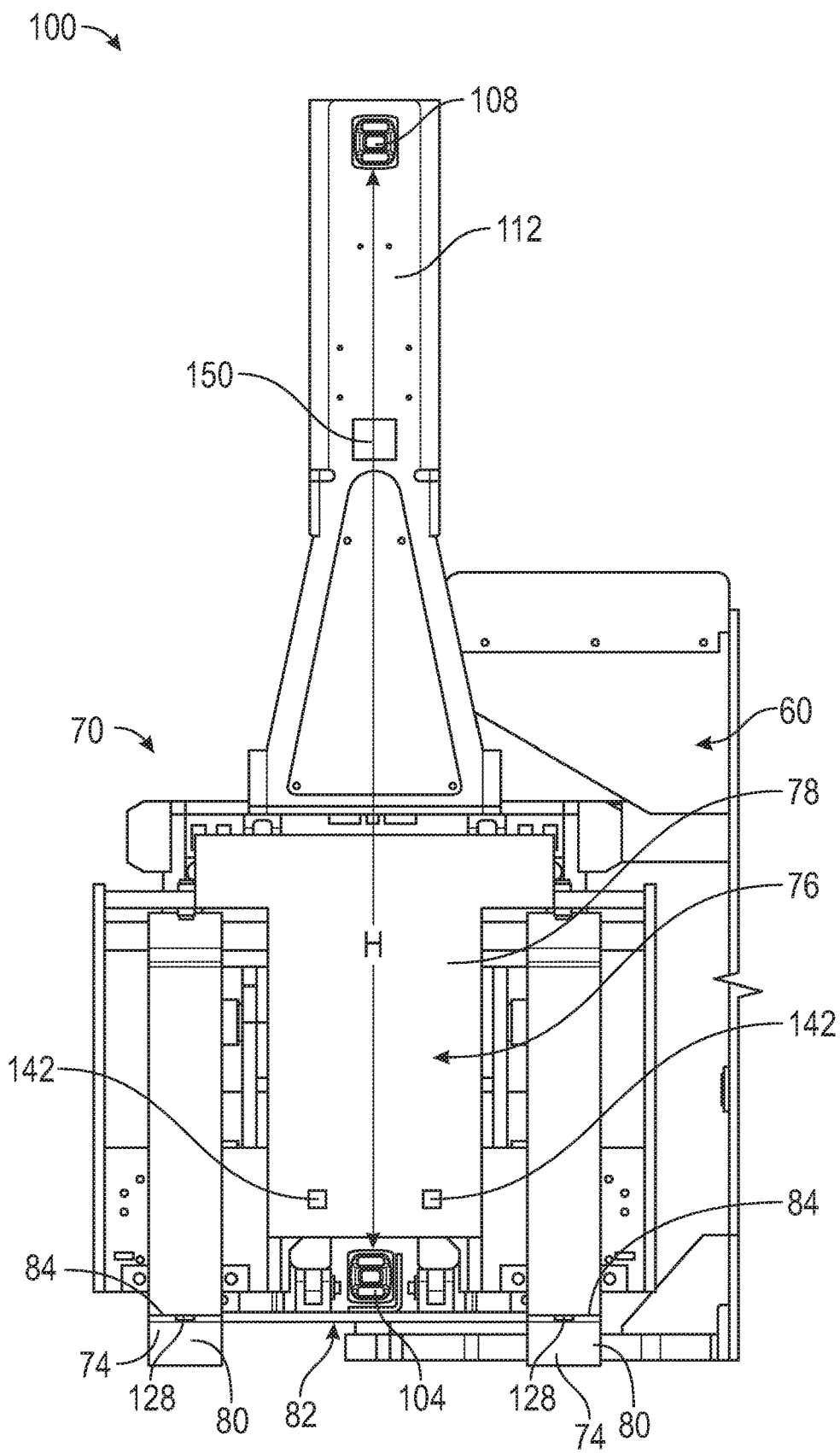
FIG. 1 is a left side elevation view of a load handling module on a material handling vehicle according to aspects of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

The invention will now be described more specifically with reference to the following embodiments. It is to be noted that the following embodiments are presented herein for purpose of illustration and description only. It is not intended to be exhaustive or to be limited to the precise form disclosed.

Disclosed herein generally is a load handling module that can be configured for an autonomous or semi-autonomous material handling vehicle (MHV). The load handling module can include at least one camera, sensor, and/or any other object detection sensor in order to selectively control a material handling vehicle to pick-up and/or drop-off a load in a variety of locations including, for example, a space in a rack or a space on the floor. Cameras can be arranged so that, while a load is carried by the MHV, a bottom portion of the load is in one camera's field of view (FOV) and a top portion of the load is in another camera's FOV. The cameras may also be positioned so that their respective FOVs extends above, below, and/or around the sides of the load. Additionally, sensors can be positioned on or near the tips of the MHV's load-carrying forks, and can be used to detect the presence of an object in front of and/or between the forks. With the cameras and sensors, the load handling module can obtain information about the position and orientation of the load and the space around the MHV, and then use the collected information to pick-up or drop-off the load.

Referring now to the figures, and in particular to FIGS. 1-5, an embodiment of a load handling module 100 that can be attached to a fork carriage or assembly 70 of a MHV 60 is shown. The MHV 60 may comprise a mast 72 and the fork assembly 70 coupled to the mast 72. The fork assembly 70 can include two forks 74 (i.e., load supporting members) that are laterally separated from one another. Each fork 74 may extend from a front side 76 of a load backrest 78 to a respective fork tip 80 of opposite the load backrest 78. The forks 74 can be positioned proximate a bottom side 82 of the fork assembly 70 such that top surfaces 84 of the forks 74 are generally horizontal and coplanar.

In some embodiments, the fork assembly 70 may be movably coupled to the MHV 60 such that the fork assembly 70 can selectively translate, rotate, or a combination thereof, in at least one direction relative to the MHV 60. In the illustrated embodiment, the fork assembly 70 may be vertically movable (e.g., in a direction perpendicular to a floor on which the MHV 60 travels) and pivotally rotatable relative to the mast 72 (see FIG. 3). Additionally or alternatively, the forks 74 may be configured to selectively translate, rotate, or a combination thereof, in at least one direction relative to the fork assembly 70. In some embodiments, the MHV 60 may include a height sensor that is configured to measure a height of the forks 74, for example, relative to a floor on which the MHV 60 travels. In some embodiments, a MHV may include a fork assembly having more or fewer load supporting members, and at least one load supporting member may be in a different position than the forks 74 illustrated in FIGS. 1-5.

Figure 2:
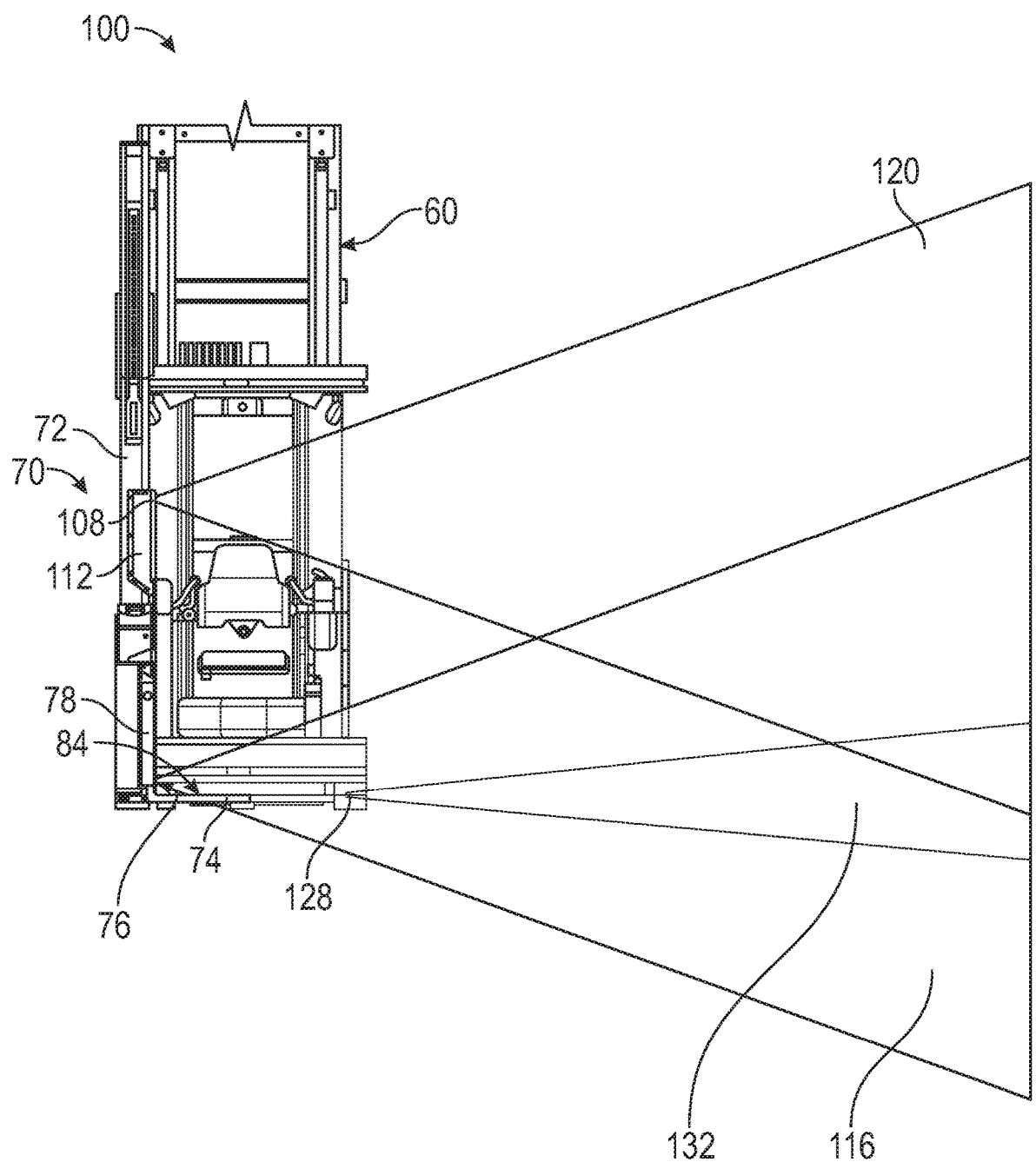
FIG. 2 is a front elevation view of the load handling module and material handling vehicle of FIG. 1 with a first camera field of view, a second camera field of view, and the fork tip sensor fields of view according to aspects of the present disclosure.
Figure 3:
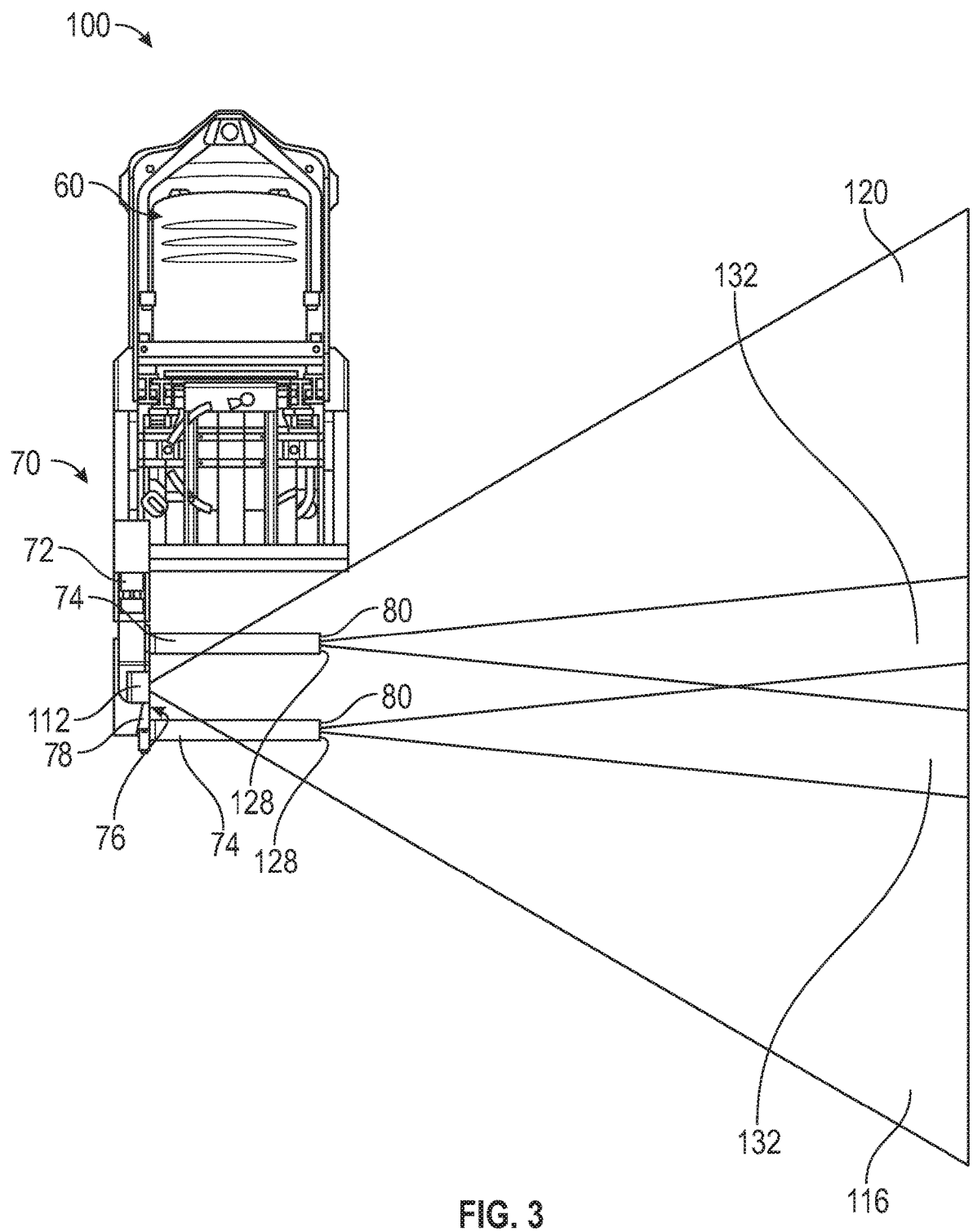
FIG. 3 is a top-down plan view of the load handling module and material handling vehicle of FIG. 2, including the first camera, second camera, and fork tip sensor fields of views according to aspects of the present disclosure.
Figure 5:
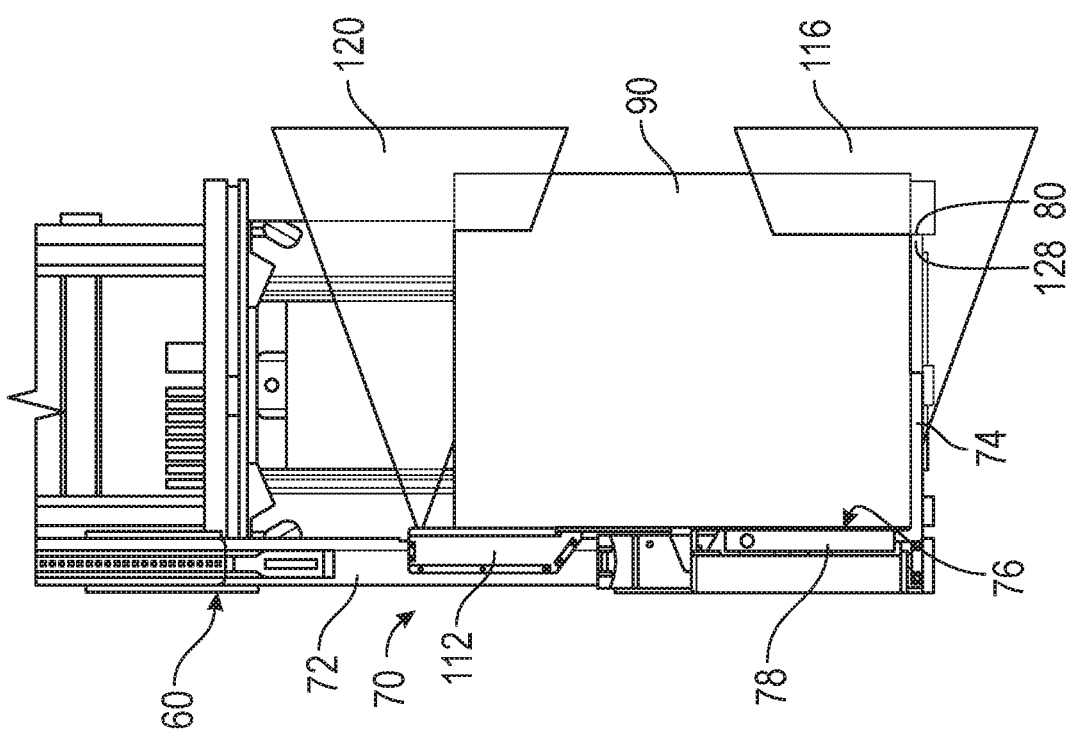
FIG. 5 is a front elevation view of the load handling module, material handling vehicle, and load of FIG. 3, including the first camera field of view and the second camera field of view according to aspects of the present disclosure.
Figure 4:
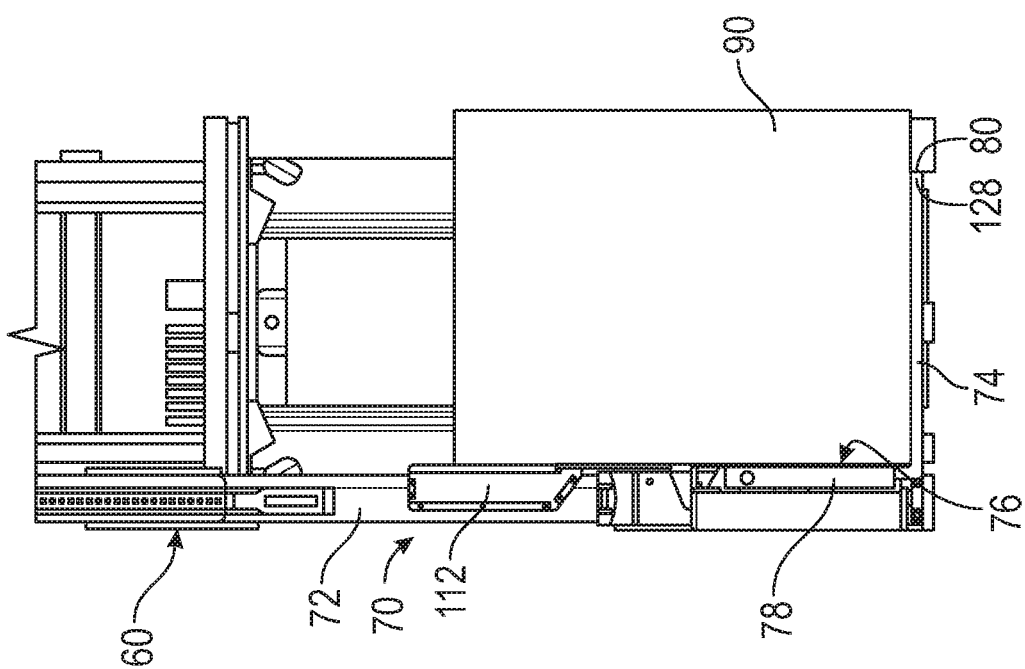
FIG. 4 is a front elevation view of the load handling module and material handling vehicle of FIG. 3, wherein a load is supported by the material handling vehicle according to aspects of the present disclosure.
Figure 11:
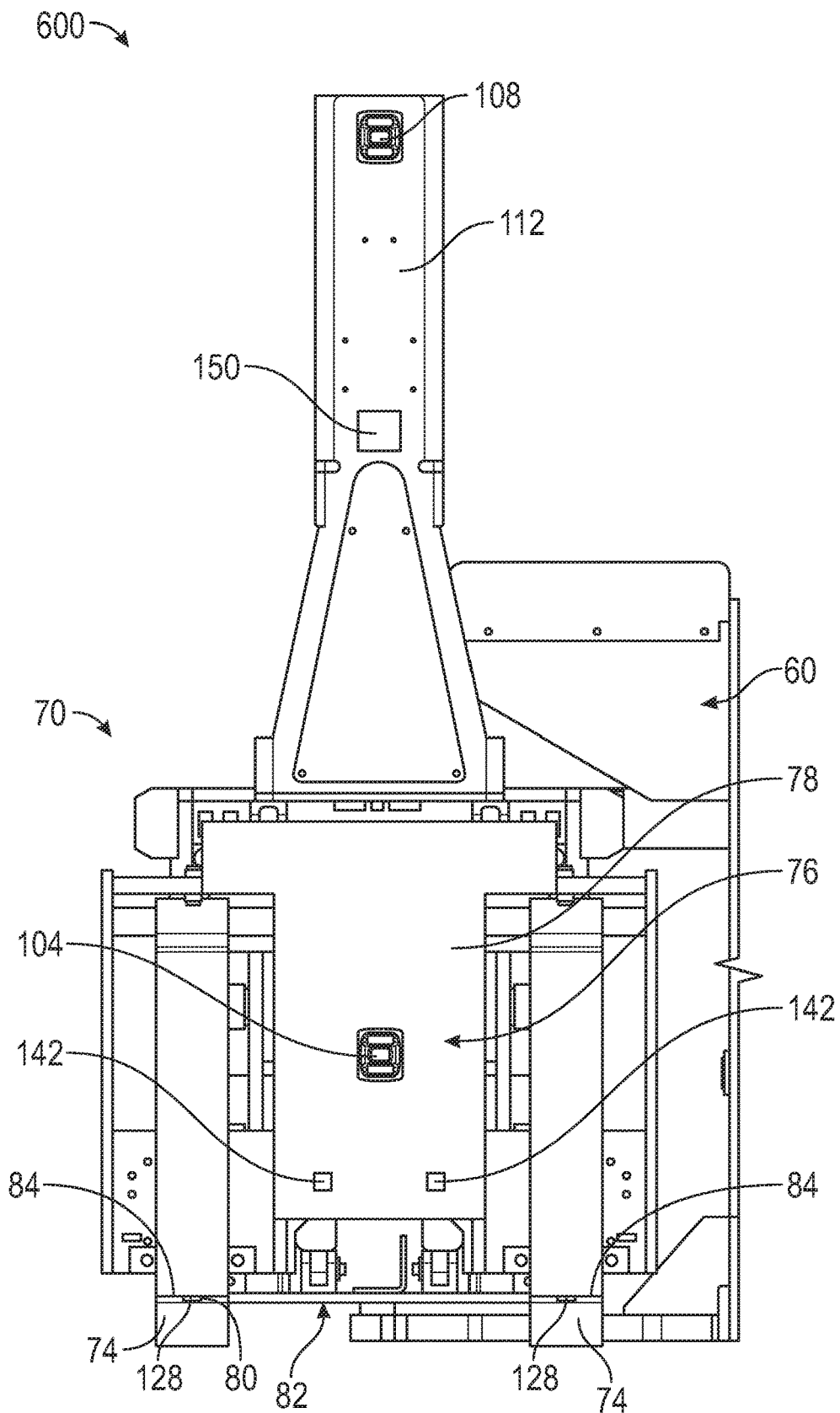
FIG. 11 is a left side elevation view of a load handling module on a material handling vehicle according to aspects of the present disclosure.

The load handling module 100 can include a first camera 104 mounted to the load backrest 78, and a second camera 108 mounted above the first camera 104 in a tower 112 that extends upwardly from a top side of the load backrest 78. Generally, the first camera 104 may be positioned slightly above a top surface 84 of the forks 74. For example, the first camera 104 may be positioned so that a lower surface thereof is substantially coplanar with the top surface 84 of the forks 74. In some embodiments, the first camera 104 may be positioned so that the lower surface thereof is above the top surface 84 of the forks 74, such as, e.g., at least one centimeter ("cm"). In some embodiments, the first camera 104 may be positioned so that the lower surface thereof is between one and eighty cms above the top surface 84 of the forks 74, an example of which is shown in FIG. 11. The first camera 104 may be positioned between the forks 74 so that the forks 74 are substantially symmetrical about the first camera 104. Further, the first camera 104 may be oriented to project in a forward direction away from the load backrest 78 so that a first field of view (FOV) 116 (see, e.g., FIG. 2) of the first camera 104 extends in front of the fork assembly 70. More specifically, as best seen in FIG. 2, the first FOV 116 may extend toward the fork tips 80 of the forks 74. In some embodiments, the first camera 104 may be positioned so that the first FOV 116 is generally angled toward, away from, or parallel to the forks 74.

Returning to FIG. 1, the second camera 108 can be similarly positioned between the forks 74 so that the forks 74 are substantially symmetrical about the second camera 108. A second FOV 120 of the second camera 108 may extend in front of the fork assembly 70. Again, more specifically, the second FOV 120 of the second camera 108 may extend toward the tips 80 of the forks 74. Further, the second camera 108 may be positioned so that the second FOV 120 is generally angled toward, away from, or parallel to the forks 74.

In some embodiments, the height of the second camera 108 above the first camera 104 may be defined by an average height of a load that is handled by the MHV 60. For example, the vertical distance between the first camera 104 and the second camera 108 (i.e., height H) may be dimensioned to be a predetermined distance above the average height of the loads carried by the MHV 60. In some embodiments, the height H may be at least fifty cms. Further, in some embodiments, the height H may be at least one hundred cms. When a load 90 is supported on the forks 74 (see, e.g., FIG. 5), the second FOV view 120 may extend above, beyond, or otherwise past the load 90 so that the second camera 108 may view at least a portion of the load 90 and an area above the load 90. This positioning may be useful, for example, so that the second camera 108 can check a desired drop-off location when lifting up a load past structures, such as, e.g., a drop-off location load beam, on a rack (i.e., a horizontally-extending beam on a rack above which a load may be placed).

In some embodiments, at least one of the first camera 104 and the second camera 108 may be a 3-D camera (e.g., a time-of-flight camera) that may be able to measure distances. More specifically, a 3-D camera is generally a camera that can provide an output that makes it possible to assess the position of coordinates in a three-dimensional volume of space (i.e., x, y, and z coordinates). The 3-D camera is preferably provided with illumination possibilities such that if the surrounding are dark the camera itself can achieve a sufficient lighting for providing a correct output. A 3-D camera generally has a FOV that can be defined by a particular range. For example, the 3-D cameras included herein may have an FOV of 20° to 180°. In some embodiments, the 3-D cameras included herein may have an FOV of 35° to 70°. Further, some embodiments can include at least one of a first camera and a second camera with a FOV that is differently shaped, sized, and/or oriented than at least one of the illustrated FOVs. For example, at least one of a first FOV and a second FOV can extend from the respective camera with a wider or narrower viewing angle than as illustrated. Additionally or alternatively, the FOV of at least one camera may be asymmetrical.

With continued reference to FIG. 1, a load handling module can include at least one fork tip sensor 128 positioned proximate the fork tip 80 of at least one of the forks 74. For example, the load handling module 100 can include at least one fork tip sensor 128 mounted in or on the fork tips 80. Each fork tip sensor 128 may be configured to detect the presence or absence of an object within a tip sensor FOV 132 (see, e.g., FIG. 3), which may extend from the fork tip sensor 128 in a direction away from the load backrest 78 (e.g., in front of the fork tips 80). Additionally, in some embodiments, a portion of at least one tip sensor FOV 132 can be angled laterally inward to extend in the direction of the other fork 74, which may be helpful to detect the presence of an object between the two forks 74. In some embodiments, a portion of a tip sensor FOV 132 may extend laterally between the two forks 74. Additionally or alternatively, each of the fork tip sensor 128 may include a plurality of individual sensors arranged in an array. For example, individual sensors can be arranged laterally along the fork tip 80 from an outer edge toward an opposing inner edge, the inner edge being closer to the opposing fork 74 than the outer edge. In some embodiments, at least one of the individual sensors arranged proximate the inner edge of a fork may be angled laterally inward (i.e., toward a centerline between the forks 74 or the opposing fork 74). For example, a center fork tip sensor can be configured to detect a center stringer (or any other object) between the two forks 74. In some embodiments, at least one fork tip sensor 128 can be (or can include) at least one of a time-of-flight sensor (e.g., a LiDAR sensor), a camera, and any other type of object detection sensor. It should also be appreciated that some embodiments can include at least one fork tip sensor with a tip sensor FOV that is differently shaped, sized, and/or oriented than the illustrated tip sensor FOVs 132. For example, at least one tip sensor FOV can extend from a fork tip sensor with a wider or narrower viewing angle than as illustrated. Additionally or alternatively, at least one tip sensor FOV may be asymmetrical.

Returning to FIG. 1, the load handling module 100 may include one or more load seated sensors 142 that are configured to detect if a load is seated on and fully received by the forks 74. For purposes of description only, a load may be considered to be fully seated onto the forks 74 when the load contacts the load backrest 78, as shown, e.g., in FIG. 4. For example, a load seated sensor 142 can be attached to, or arranged on the same vertical plane as, the load backrest 78, and may be configured to detect when a load has been fully seated onto the forks 74. The load stated sensor 142 can be a mechanical sensor or switch, a time-of flight-sensor, or any other object detection or position-sensing sensor. Additionally, at least one weight sensor (not shown) can be configured to determine the weight of a load carried by the MHV 60, and may be incorporated into at least one of a fork 74, the load backrest 78, or any other part of the fork assembly 70 and the MHV 60.

In some embodiments, however, at least one of the first camera, the second camera, a fork tip sensor and a load seated sensor can be positioned in a different location than those of the illustrated embodiments. For example, at least one of the first camera and the second camera may can be positioned proximate a side of the backrest, over (or in) a fork, on the MHV, and/or in any other location on the fork assembly or the MHV. Additionally or alternatively, the load handling module can include at least one additional sensor, which may be the same or different than those of the illustrated embodiments. For example, a load handling module can include at least one additional camera, fork tip sensor, and/or any other object detection sensor.

Still referring to FIG. 1, the load handling module 100 can also include a controller 150 that is in communication with at least one of the first camera 104, the second camera 108, at least one fork tip sensor 128, the load seated sensor 142, the weight sensor, and any other type of sensor (e.g., a fork height sensor) or input device. The controller 150 may also be in communication with a warehouse management system (WMS) and primary navigation unit, which may include at least one additional sensor or locating apparatus that allow the MHV 60 to be an automatically guided. For example, a primary navigation unit can include at least one of cameras, global positioning systems (GPS), rotating laser scanners, motion sensors, LiDAR systems, simultaneous localization and mapping (SLAM) systems, spot navigation systems using radio-frequency identification (RFID) or magnets, and wire guidance systems. In some embodiments, the controller can be in the MHV or the primary navigation unit and the load handling module 100 may not have a separate controller.

Figure 6:
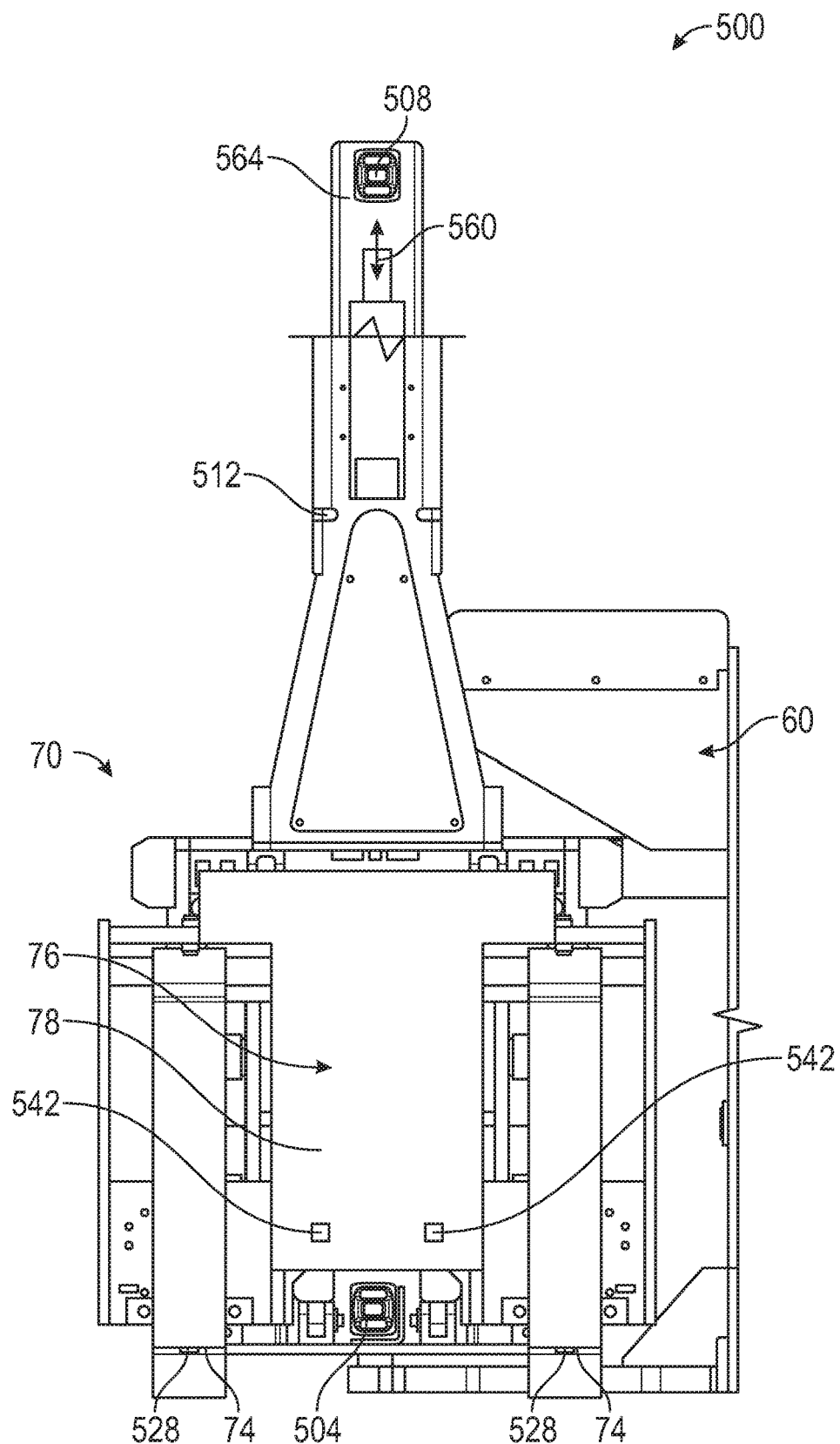
FIG. 6 is a left side elevation view of a load handling module with an adjustable tower on a material handling vehicle according to aspects of the present disclosure.
Figure 7:
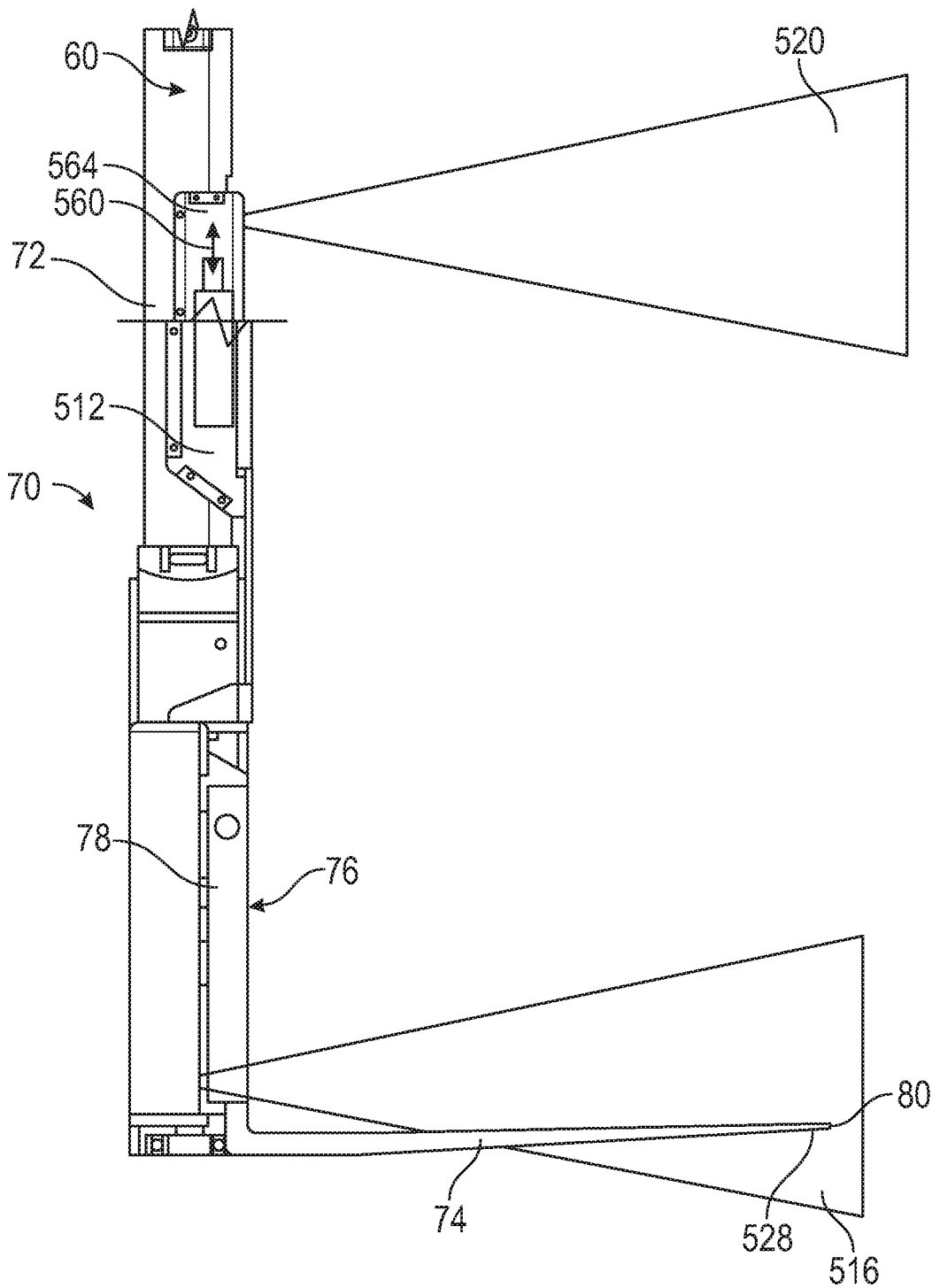
FIG. 7 is a front elevation view of the load handling module and material handling vehicle of FIG. 6 with a first camera field of view and a second camera field of view according to aspects of the present disclosure.

As mentioned above, in some embodiments, the position of at least one of the first camera 104 and the second camera 108 may be adjustable. For example, FIGS. 6 and 7 illustrate a load handling module 500 according to another embodiment of the present disclosure. The loading handling module 500 is generally similar in design and functionality to the load handling module 100 of FIGS. 1-5, with like elements identified using like reference numerals, except as described herein or as apparent from the figures. For example, a second camera 508 of the load handling module 500 may be included in (or on) a tower 512 mounted on the load backrest 78. The tower 512 may further include an actuator 560 coupled to a movable section 564 of the tower 512. The actuator 560 can be an electric actuator, a hydraulic actuator, or any other type of actuating system or device, and can be configured to selectively move the movable section 564 of the tower 512 including the second camera 508 relative to the fork assembly 70. The actuator 560 may be configured to selectively alter a height between the first camera 504 and the second camera 508, for example, to compensate for varying load heights. For example, referring to FIG. 7, if the second camera 508 is unable to detect a top of a load when the load has been verified as being seated on the forks 74 (e.g., via a load seated switch), the actuator 560 may adjust the height of the second camera 508 until a second camera FOV 520 extends past the top of the load (i.e., the second camera 508 detects a top of the load). Alternatively or additionally, if a load is detected on the forks and the second camera 508 cannot see above the load (i.e., the load is substantially or completely blocking the second camera FOV 520), the height of the second camera 508 may be adjusted until a portion of the second camera FOV 520 is unobstructed. For example, the second camera 508 may move until at least 25%, 40%, or 60% of the second camera FOV 502 is not obstructed by the load. Further, in some embodiments, an actuator may be configured to move the second camera 508 within the tower 512. That is, an actuator may be configured to pivot, rotate, or translate the second camera 508 relative to the tower 512 and/or the moveable section 564. Additionally, one or more displacement sensors, e.g., a string potentiometer, an encoder, a position transducer, can be included to measure a height displacement of the second camera 508.

Figure 8:
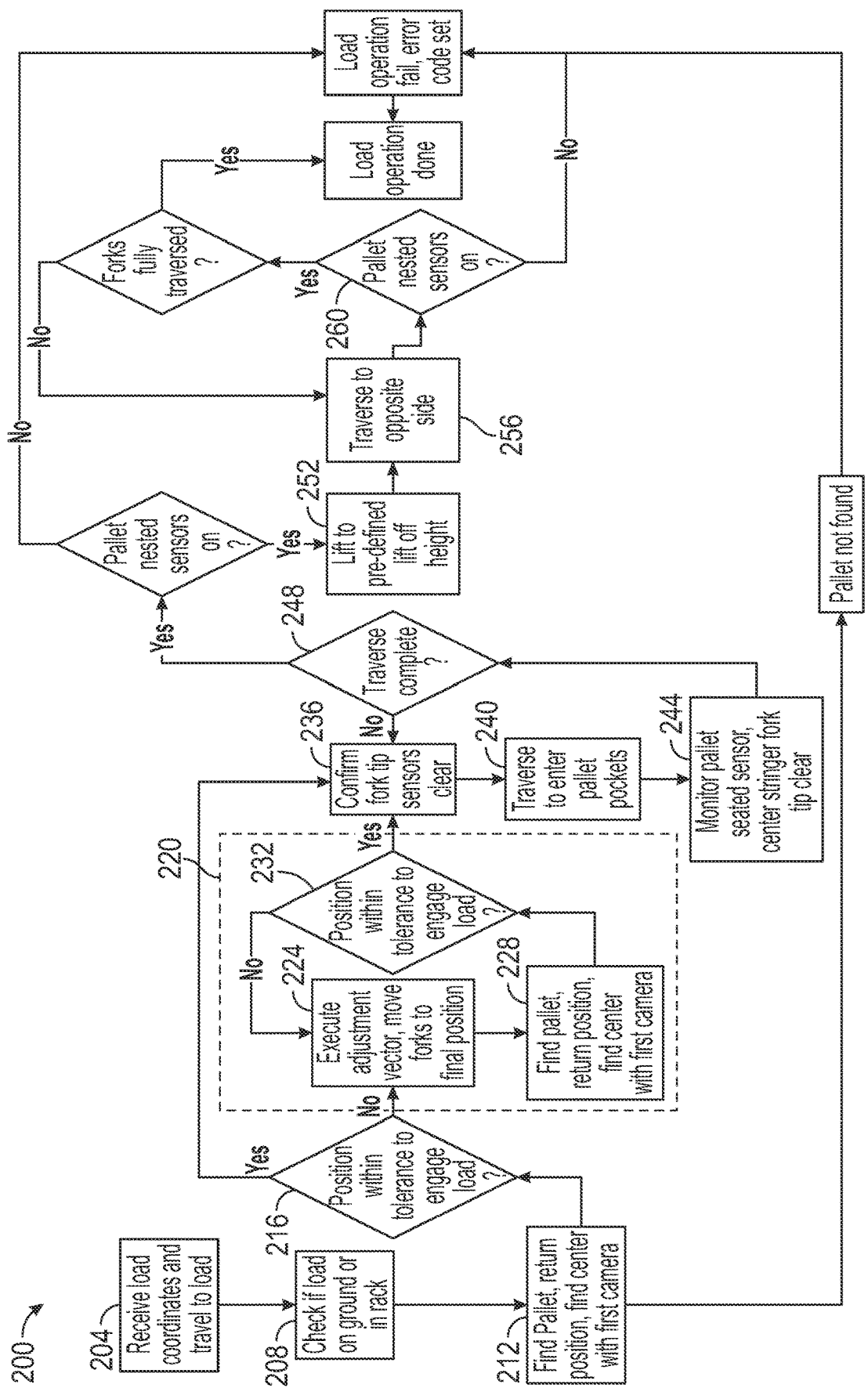
FIG. 8 is a process chart for a method of picking up a load according to aspects of the present disclosure.
Figure 9:
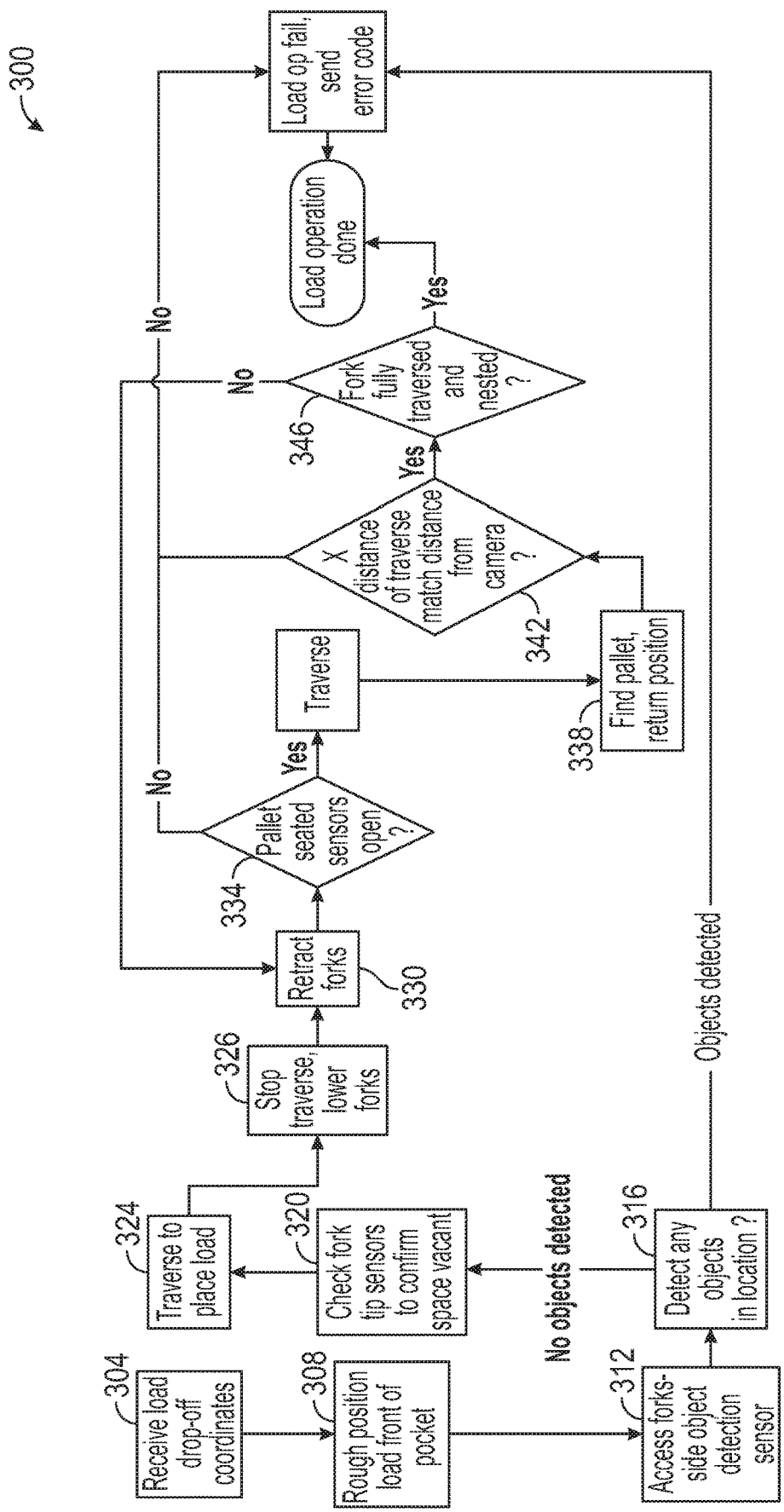
FIG. 9 is a process chart for a method of dropping off a load on the ground according to aspects of the present disclosure.
Figure 10:
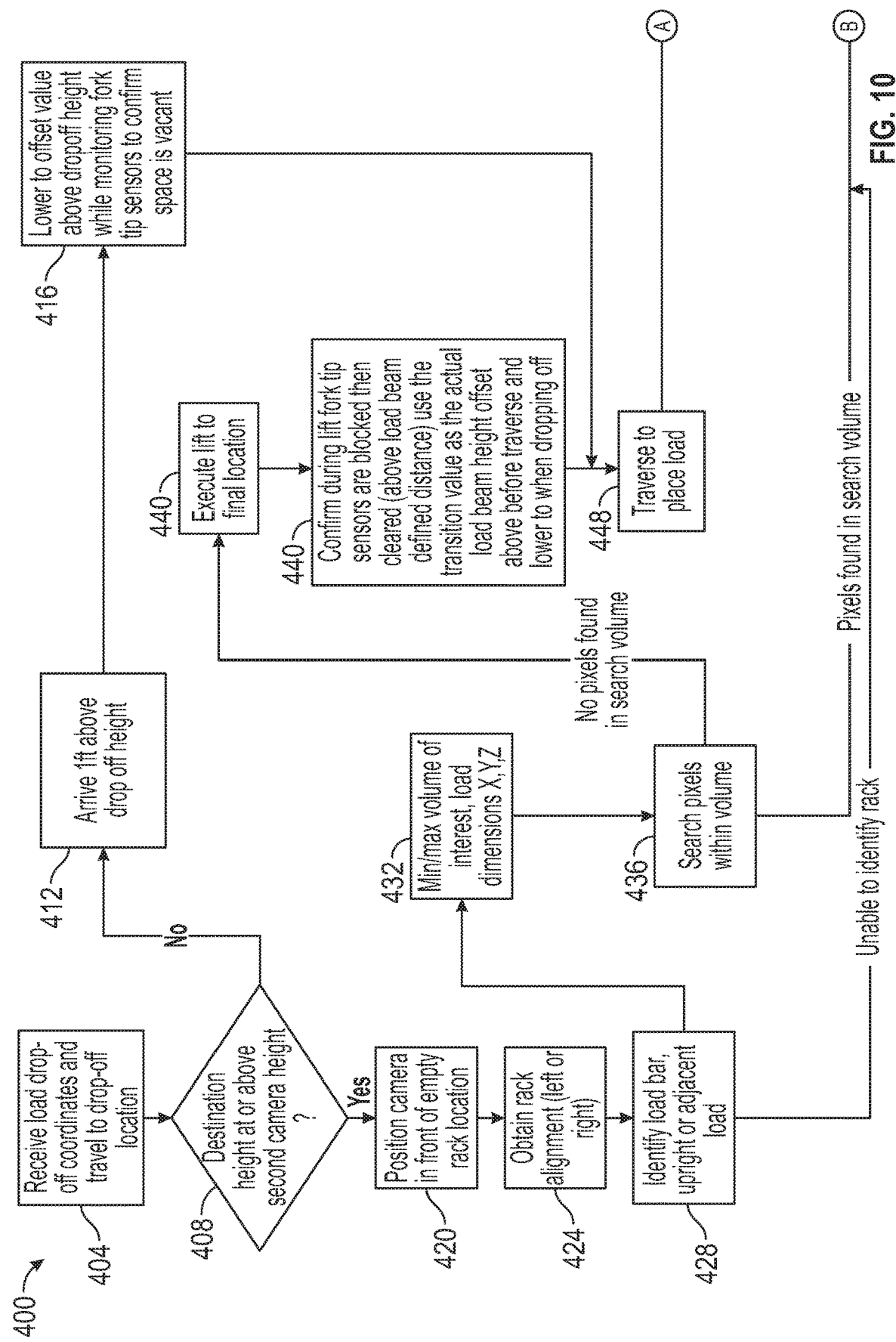
FIG. 10 is a process chart for a method of dropping off a load on a rack according to aspects of the present disclosure.
Figure 10:
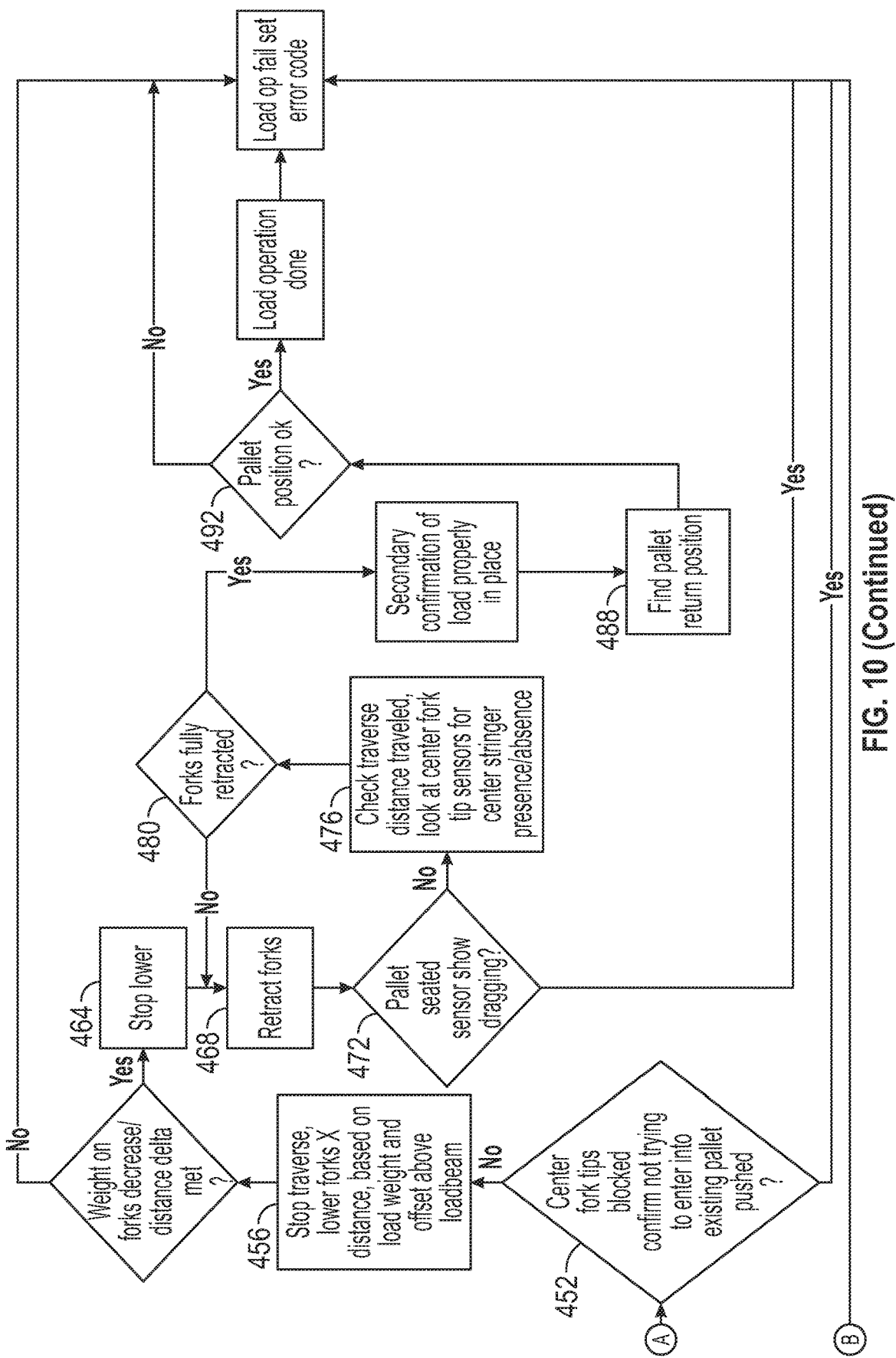

Generally, load handling modules disclosed herein may use data communicated to a controller and/or the primary navigation unit by the at least one of a WMS, connected sensors, and an operator to control a MHV to pick-up or drop-off a load. FIGS. 8-10 illustrate exemplary methods for pick-up or drop-off of a load using load handling modules according to non-limiting examples of the present disclosure. Although the methods are described with reference to the load handling module 100 and material handling vehicle 60 of FIGS. 1-5, the same or similar methods may be used with other material handling vehicles and/or load handling modules.

FIG. 8 illustrates a method 200 for picking up a load using the MHV 60 with the load handling module 100 described above with reference to FIGS. 1-5. The method may comprise receiving load coordinates and traveling to a load 90 at step 204. More specifically, information about the load can be provided to the controller 150 from, for example, the WMS. The target load information may include at least one of a grid location (e.g., an X-Y position) of the load, whether the load is stored on the floor or on a rack, the height of the load pick up location (e.g., a rack height), the dimensions of the load, the weight of the load, and any other information about the load, the pick-up location, a drop-off location, or operational parameters for the MHV 60. The MHV 60 can then travel autonomously to the X-Y position of the load. In some embodiments, the height sensor may communicate a height of the forks 74 to the controller 150 to determine if the load handling procedures described herein may occur at height (i.e., above ground level).

The method 200 may further comprise checking if the load is on the ground or in a rack (or on an elevated structure) at step 208, which may be done by the controller 150. This operation may include, for example, determining if the target load is on a rack based on a height coordinate provided in step 204. Additionally or alternatively, data acquired from at least one of the first camera 104, the second camera 108, a fork tip sensor 128, any other object detection system on the MHV 60, and any other information communicated to the controller 150 may be used to determine if the load is on the ground or in a rack. In some embodiments, the controller 150 on a MHV 60 can be configured to perform the step 208 of checking if the load is on the ground or in a rack before the MHV 60 has moved to the location of the load, while the MHV 60 is moving to the location of the load, once the MHV arrives at the location of the load, or any combination thereof.

After the controller 150 has determined if the target load is on the ground or on a rack, the method 200 may comprise locating a pallet on which the target load is supported at step 212. For example, in some embodiments, the first camera 104 may identify a center of the pallet by identifying a center stringer of the pallet. This operation may include moving the fork assembly 70 so that the pick-up location of the load is in the first FOV 116 of the first camera 104. Additionally or alternatively, some embodiments can be configured to use at least one of the second camera 108, a fork tip sensor 128, and any other object detection system to identify a pallet supporting the target load. If the pallet is unable to be located, the controller 150 may set an error code or send an error message. If the pallet is located, however, the load handling module 100 may determine if the pallet is positioned within a predefined tolerance for the forks 74 to engage the load in step 216. For example, the controller 150 may determine if the centers of the forks 74 are substantially aligned with the centers of the pallet pockets positioned on opposite sides of the center stringer. In some embodiments, the predefined tolerance may be a position of the pallet (e.g., X, Y, and Z coordinates; roll, pitch, and yaw) relative to the forks 74.

If the pallet is not within the predefined tolerance relative to the forks 74, the position of the forks 74 may be corrected in step 220. In some embodiments, correcting the position of the forks can include executing an adjustment vector that adjusts a position of the forks 74 relative to the detected pallet position at step 224. An adjustment vector may include at least one of moving the MHV 60, moving the fork assembly 70 relative to the MHV 60, and moving the forks 74 on the fork assembly 70. After the adjustment vector has been executed, the load handling module 100 can control the first camera 104 to re-identify the center of the pallet by identifying the center in step 228, and can then determine if the adjustment vector moved the forks 74 into a position to engage the pallet (e.g., in alignment with the pallet pockets) at step 232. Step 232 may be performed using the same or a different position-detection process than the process used in step 212. In some embodiments, a fork position correction step 220 can be performed multiple times (e.g., to incrementally correct the fork position) and steps 224, 228, and 232 may be repeated. However, some position correction steps may be performed only once without any repetition of steps. In some embodiments, the controller 150 can be configured to set an error code or send an error message if the pallet position is completely outside of a maximum adjustment vector range. A load handling module 100 may be configured to use a fork position correction process that may have additional steps, or one that omits at least one of steps 220, 224, 228, and/or 232.

When it is determined that pallet position is within the predefined tolerance, the fork tip sensor(s) 128 may be configured to verify that the forks 74 are aligned with the empty space between the pallet stringers in step 236. For example, if the fork tip sensors 128 do not detect an object in their respective tip sensor FOV 132, it is confirmed that the forks 74 are properly aligned between the pallet stringers. The controller 150 may subsequently instruct the forks 74 to traverse into the pallet pockets formed between the pallet stringers in step 240. While the forks 74 are traversing into the pallet pockets, the controller 150 may monitor the progress of the traversing forks 74 in step 244. For example, the controller 150 can monitor at least one of the load seated sensor(s) 142, the pallet center stringer (using, for example, the first camera 104), and the fork tip sensor(s) 128 to check that the forks 74 are traversing properly into the pallet pockets. Additionally or alternatively, the controller 140 may monitor and/or measure a distance traveled by the forks 74.

The load handling module 100 may check if the traversal of the forks 74 is complete in step 248. For example, the controller 150 can determine if the load seated sensor(s) 142 detect that the load is fully received on the forks 74. If the load seated sensors 142 do not detect that the load is fully seated, an error code may be set. If the load seated sensors 142 detect that the load is fully received on the forks 74, the controller 150 may instruct the fork assembly 70 to raise to a predefined lift-off height to engage and raise the load in step 252.

Once the fork assembly 70 has been raised the predefined lift-off height, the controller 150 may instruct the forks 74 to traverse toward the vehicle body (i.e., back into a retracted position) to remove the load from the pick-up location in step 256. While the forks 74 are returning to the retracted position, the controller 150 may monitor the load seated sensors 142 to ensure that the load remains fully seated on the forks 74 in step 260. If the load seated sensors 142 indicate that the load is not fully seated as the forks 74 are moving, an error code may be set (or an error message may be sent) by the controller 150. Once the forks 74 have substantially or completely traversed back to the retracted position, the load picking operation may be completed. In some embodiments the MHV 60 may travel to a desired location to drop-off the load.

FIG. 9 illustrates a method 300 for dropping off a load on a ground surface using the MHV 60 with the load handling module 100 described above with reference to FIGS. 1-5. Initially, load drop-off coordinates (e.g., an X-Y position of a drop-off location) may be provided wirelessly to the controller 150 from, for example, a warehouse management system (WMS) at step 304. Once the controller 150 receives the load drop-off coordinates, the MHV 60 may travel to the X-Y position of the drop-off location, and can roughly position the carried load in front of a destination pocket (i.e., the forks 74 are aligned relative to the height of the drop-off location) at step 308.

With the load roughly positioned, the controller 150 may access a fork-side object detection sensor (e.g., an object detection sensor positioned such that the viewing angle covers the area of space to be occupied by the load on the forks 74) at step 312. The controller 150 may subsequently determine if an object (or obstruction) is within the field of view of the fork-side object detection sensor at step 316. If an object is detected in the fork-side object detection sensor's field of view, the controller 150 may set an error code or send an error message. If no object is detected in the fork-side object detection sensor's field of view, the controller 150 may check at least one fork tip sensor 136 in order to confirm that the space in front of the forks 74 is vacant (i.e., no object detected) at step 320. After it is determined that the space in front of the forks 74 is vacant, the forks 74 may be controlled to traverse to the load drop-off location at step 324. When the forks 74 reach the desired drop-off location, the forks 74 may stop and subsequently lower at step 326. In some embodiments, using a weight sensor, the controller 150 may determine if the weight on the forks 74 decreases as they are lowered in order to determine when the ground engages the load. Once the load is substantially or completely supported by the ground, downward movement of the forks 74 may cease. Additionally or alternatively, the downward movement of the forks 74 may be stopped after a predetermined distance, or using any other sensors, processes, or criteria.

Once the forks 74 have been lowered, the forks 74 can be retracted away from the load and toward the vehicle body at step 330. As the forks 74 return to the retracted position, the controller 150 may determine if the load is being dragged by checking at least one load seated sensor 142 at step 334. For example, if the load seated sensors 142 are closed (i.e., a load is still fully seated on the forks 74), the controller 150 can be configured to set an error code or send an error message. If the load seated sensors 142 are open (i.e., indicating that a pallet/load is not fully seated on the forks 74), then the forks may continue to traverse away from the load to a predetermined distance.

After the forks 74 have traversed a predetermined distance from the load, the first camera 104 may capture an image of the placed load at step 338, and the controller 150 can attempt to locate the pallet/load on the pallet in the image. At step 342, the controller 150 may then determine if the predetermined distance traversed by the forks 74 matches the distance from the load backrest 78 to the load/pallet that was measured in one or more images from the first camera. If the distances do not match, the controller 150 may be configured to set an error code or send an error message. If the distances do match, or are within a predefined tolerance of one another, the controller 150 may determine if the forks 74 are fully traversed (i.e., retracted) at step 346. If the forks 74 are not fully traversed, the forks 74 may continue to retract. If the forks 74 are fully traversed, the unloading operation is complete and the MHV 60 may continue on to another task.

FIG. 10 illustrates a method 400 for dropping off a load onto a rack or raised platform using the MHV 60 with the load handling module 100 described above with reference to FIGS. 1-5. Similar to method 300 described above, load drop-off coordinates (e.g., an X-Y position and height of a drop-off location) may be provided wirelessly to the controller 150 from, for example, a WMS at step 404. Accordingly, the MHV 60 may travel autonomously to the X-Y position of the drop-off location. When (or as) the MHV 60 reaches the X-Y position of the drop-off location, the controller 150 may determine if the destination height is at or above the current height of the second camera 108 at step 408. In some embodiments, a height sensor may communicate a height of the forks 74 to the controller 150 and the height of the second camera 108 may be known relative to the height of the forks 74. In some embodiments, step 408 may be performed while the MHV 60 is traveling to the drop-off location or before the MHV 60 begins traveling.

If the destination height is not at or above the current height of the second camera 108 (i.e., the second camera 108 is above the destination height), the forks 74 may adjust to arrive at a predefined distance above the drop-off height (e.g., one foot above the drop-off height) at step 412. From the predefined distance above the drop-off height, the forks 74 may be further lowered to a predefined offset value above the drop-off height at step 416. As the forks 714 are lowered to the predefined offset above the drop-off height, the fork tip sensor(s) 128 can indicate whether the location on the rack is vacant and able to receive a load. In some embodiments, at least one of the first camera 104, the second camera 108, and any other object detection system may be used to determine if the drop-off location on the rack is vacant.

If the destination height is at or above the current height of the second camera 108 (i.e., the second camera 108 is below the destination height), the second camera 108 may be roughly positioned in front of the drop-off location on the rack at step 420 by moving at least one of the MHV 60 and the fork assembly 70 relative to the rack. An image may then be acquired from the second camera 108, and the acquired image can be used to obtain the rack alignment at step 424. For example, the controller 150 can use the second camera 108 to determine lateral alignment relative to the racking structure (i.e., left alignment or right alignment). Further, in some embodiments, the second camera 108 may be used to search for a racking junction of an upright beam and a load beam. If the racking junction is found, the position of the racking junction relative to the second camera 108 may be calculated, and the position of at least one of the forks 74, the fork assembly 702, and the second camera 108 may be adjusted based on the location of the load junction.

At step 428, the second camera 108 may be used to identify features on the rack, such as, e.g., a horizontal load bar, an upright beam, or an adjacent load (i.e., a load next to the desired drop-off location on the rack). If the rack or components thereof cannot be located, the controller 150 may set an error code or send an error message. However, if the rack is identified, one or more of the identified features may be used to quantify a minimum volume of interest and a maximum volume of interest at step 432. For example, a minimum and/or maximum volume of interest may be based on the load dimensions, a lift off height, and a buffer of spacing desired between loads and between load and rack upright. In some embodiments, the load dimensions (e.g., length, width, and height) may be predetermined values known by the controller 150. Additionally or alternatively, the load dimensions may be supplied to the controller 150 by the WMS and/or any other source of information. Further, the controller 150 may compare the defined volume of interest to the volume of unoccupied space at the drop-off location, which may be measured by the second camera 108.

Once the minimum and maximum volumes of interest have been quantified, and it has been determined that the load may fit therein, the second camera 108 may verify that the search volume is empty (e.g., by analyzing pixels in an image for indications of an object) at step 436. If an object or another structure is detected (e.g., by the presence of a predetermined amount of pixels having an intensity indicative of an object/structure), the controller 150 may set an error code or send an error message. If the search volume is determined to be empty, then the forks 74 may be raised to a final drop-off height at step 440. While the forks 74 are being raised to the drop-off height, the controller 150 may monitor the fork tip sensor(s) 128 to identify a transition from a blocked state to an unblocked state at step 444. More specifically, the fork tip sensor(s) 128 may be configured to detect when a load beam in the tip sensor FOV 132, and when the forks 74 are above the load beam and the tip sensor FOV 132 is clear. The controller 150 may use the transition height value (i.e., the height value when fork tip sensors 128 transition from blocked to unblocked) to calculate a predefined offset value above the transition height. Once the forks 74 reach the drop-off height, the forks 74 may be moved to a predefined offset above the transition height value.

With the forks 74 arranged at a predefined offset above the transition height value or the drop-off height, the forks 74 may traverse (i.e., extend) into the rack to place the load at step 448. When (or as) the forks 74 are traversing into the rack, the controller 150 may monitor at least one fork tips sensor 128 in order to ensure that the forks are not entering into an existing pallet. For example, the controller 150 may determine if at least one center fork tip sensor (i.e., the centrally-arranged fork tip sensors that are directed to detect the center stringer) is blocked. If a center fork tip sensor is blocked (which may indicate that a fork 74 is entering another pallet), the controller 150 may set an error code or send an error message. Additionally or alternatively, the controller 150 can be configured to determine if the pallet is being pushed. For example, the distance to a pallet may be measured and compared to the distance the forks 74 have moved. In some embodiments, the same or a different push detection method may be implemented when a pallet is being picked up.

If the forks 74 remain unblocked and have traversed into the rack a predetermined distance, then the extension of the forks 74 may be stopped, and the forks 74 may be lowered a predefined distanced at step 456. In some embodiments, the predefined distanced can be based on at least one of a load weight, (which may have been measured using a load weight sensor or provided to the controller 150 by the WMS) and the predefined offset height above the load beam. For example, as the forks 74 are lowered, the controller 150 may determine if the weight on the forks 74 decreases or, which may indicate that the load is supported by the rack. Additionally or alternatively, the controller 150 may compare a preset lowering distance, which can be based on at least one of the transition height value and a predefined offset value, to the distance the forks 74 have been lowered. Once it is determined that the weight on the forks 74 has decreased and the preset lowering distance is met, downward movement of the forks 74 can be stopped in step 464, and the forks 74 may be retracted back toward the retracted position (i.e., out of the rack and toward the vehicle body) at step 468. If, however, the weight on the forks 74 does not decrease as they are lowered and/or the preset lowering distance is not met, then the controller 150 may set an error code or send an error message.

As the forks are being retracted, the controller 150 may monitor at least one load seated sensor to determine if the pallet is dragging at step 472. For example, if the load seated sensors 142 remain closed after a predetermined amount of time (providing a positive indication of pallet dragging), movement of the forks 74 may be stopped and the controller 150 may set an error code or send an error message. If the load seated sensors 142 switch to an open state (e.g., indicating that a load is not seated on the forks 74), the retraction of the forks 74 may continue.

The controller 150 can also be configured to monitor a distance that the forks 74 are retracted. For example, the first camera 104 may be used to measure a distance between the load and the first camera 104 and/or the load backrest 78 to determine a distance the forks 74 have been retracted. In some embodiments, the controller 150 may compare a distance traversed by the forks 74 (as measured by using another method or sensor) to determine if it matches the distance from the load backrest 78 to the load/pallet that was measured in the first camera image. Additionally or alternatively, the controller 150 may check at least one fork tip sensor 128 to determine if the pallet has been unloaded by monitoring a portion of the tip sensor FOV between the forks 74 (e.g. monitoring a center fork tip sensor) to determine if the center stringer on the pallet is still between the forks 74. Based on at least one of the monitored retraction distance and the presence/absence of the center stringer being sensed by a center fork tip sensor, the controller 150 can determine if the forks 74 have been fully retracted at step 480. If they have not been fully retracted, the forks 74 may continue to retract, and the controller 150 may continue to monitor pallet dragging, the retraction distance, and for the presence/absence of the center stringer. In some embodiments at least one of steps 472, 476, and/or 480, and any other steps for checking for pallet dragging and/or measuring retraction distance can be performed at least once.

When the forks 74 have fully retracted, the controller 150 may perform a secondary confirmation of the load placement using the first camera 104 at step 488. At least one of the first camera 104 and the second camera 108 may capture an image of the load, which may be used to locate the pallet and/or the load in order to determine a load position. The controller 150 may determine if the measured load position matches the desired load drop-off coordinates within a predefined tolerance at step 492. If the load position is within the predefined tolerance, the load operation is completed and the MHV 60 may perform another task. If the load position is not within the predefined tolerance, the controller 150 may set an error code or send an error message.

FIG. 11 illustrates another load handling module 600 according to embodiments of the present disclosure. The load handling module 600 may be similar in design and functionality to the load handling module 100 of FIGS. 1-5, with similar elements identified using like reference numerals, except as described herein or as apparent from the figures. For example, a first camera 704 is positioned so that a lower surface thereof is disposed above the top surface 84 of the forks 74. In some embodiments, the first camera 704 may be at least ten, fifteen, or twenty cms above the top surface 84 of the forks 74.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, firmware, software, including program instructions executing on a computer, or any combination of thereof. Accordingly, this description is meant to be taken only by way of example, and not to otherwise limit the scope of this invention.

We claim:

1. A load handling module for a material handling vehicle, the material handling vehicle including a vehicle body, a mast, a tower, and at least one fork extending from a load backrest to a tip end, the tower extending upwardly from the load backrest, and the at least one fork being selectively movable relative to the vehicle body and configured to support a load, the load handling module comprising:
a first camera secured to the load backrest and positioned proximate a top surface of the at least one fork, the first camera being configured to determine a position of an object in a first camera field of view;
a second camera secured to the tower so that it is positioned above the first camera, the second camera being configured to determine the position of an object in a second camera field of view;
a fork tip sensor secured to the at least one fork proximate a tip end, the fork tip sensor being configured to detect a presence of an object within a fork sensor field of view extending in front of the tip end; and
a controller in communication with the first camera, the second camera, and the fork tip sensor, the controller being configured to autonomously control movement of the at least one fork;
wherein the tower includes a tower actuator configured to selectively move the second camera with respect to the first camera.

2. The load handling module of claim 1, wherein the first camera field of view is configured to cover at least a portion of a bottom of the load when the load is supported on the at least one fork.

3. The load handling module of claim 1, wherein the second camera field of view is configured to cover at least a portion of a top of the load when the load is supported on the at least one fork.

4. The load handling module of claim 1, wherein the at least one fork includes two forks that extend from the load backrest to a respective tip end, and wherein the first camera and the second camera are positioned between the two forks.

5. The load handling module of claim 4, wherein the fork tip sensor is a first fork tip sensor secured to a first fork of the two forks proximate the tip end of the first fork;
wherein the load handling module further comprises a second fork tip sensor secured to a second fork of the two forks proximate the tip end of the second fork;
wherein the first and second forks are configured to detect the presence of an object between the first fork and the second fork.

6. The load handling module of claim 1, further comprising a load seated sensor configured to detect if the load is fully seated on the at least one fork.

7. The load handling module of claim 1, further comprising a weight sensor configured to determine the weight of the load supported by the at least one fork.

8. A method for picking up a load with a material handling vehicle that includes at least one fork extending from a load backrest, a mast, a tower extending upwardly from the load backrest, a first camera mounted to the load backrest, a second camera mounted to the tower, and a fork tip sensor disposed proximate a tip of the at least one fork, the method comprising:
   moving the material handling vehicle to a pick up location;
   identifying a pallet the load is resting on;
   aligning the at least one fork with the pallet by moving the at least one fork into alignment with a pallet pocket of the pallet;
   determining if the at least one fork is aligned with the pallet pocket;
   extending the forks, relative to a vehicle body of the material handling vehicle, to engage the pallet; and
   lifting and retracting forks to pick up the load with the fork,
   wherein identifying the pallet includes using at least one of the first camera and second camera to identify a center stringer of the pallet, and wherein determining if the at least one fork is aligned with the pallet pocket includes using at least one of the first camera and the second camera to determine if the pallet is positioned within a predefined tolerance from the at least one fork.

9. The method of claim 8, further comprising correcting a position of the fork relative to the pallet pocket by detecting a pallet position and executing an adjustment vector that adjusts a position of the fork relative to the detected pallet position.

10. The method of claim 8, further comprising verifying that the at least one fork is aligned with the pallet pocket using the fork tip sensor.

11. The method of claim 8, wherein extending the forks to engage the pallet further comprises determining, with a load seated sensor, that the at least one fork fully engages the load.

12. A method for dropping off a load supported by a material handling vehicle, the material handling vehicle including at least one fork extending from a load backrest, a mast, a tower extending upwardly from the load backrest, a first camera mounted to the load backrest, a second camera mounted to the tower, and a fork tip sensor disposed proximate a tip of the at least one fork, the method comprising:
   moving the material handling vehicle to a drop-off location provided wirelessly to a controller;
   determining if the drop-off location is vacant using at least one of the second camera and the fork tip sensor to search for a presence of an object in the drop-off location;
   extending the forks, relative to a vehicle body of the material handling vehicle, to move the load into the drop-off location;
   lowering the forks to place the load in the drop-off location;
   retracting the forks to disengage the load; and
   verifying that a position of the load is within a predefined tolerance of the drop-off location using at least one of the first camera and second camera to measure a distance between the load and the at least one of the first camera and the second camera.

13. The method of claim 12, wherein determining if the drop-off location is vacant further comprises analyzing pixels in an image for indications of an object.

14. The method of claim 12, wherein determining if the drop-off location is vacant further comprises identifying at least one of a horizontal load bar, an upright beam, and an adjacent load of a racking structure.

15. The method of claim 14, wherein determining of the drop-off location is vacant further comprises quantifying at least one of a minimum volume of interest or a maximum volume of interest.

16. The method of claim 12, further comprising raising the forks to a drop-off height, wherein the fork tip sensor quantifies a predefined offset height associated with a horizontal load bar of a drop-off racking structure, and wherein the forks are raised the distance of the predefined offset height.

17. The method of claim 16, wherein lowering the forks to place the load in the drop-off location comprises lowering the forks at least the distance of the predefined offset height.

18. The method of claim 12, wherein verifying the position of the load includes capturing an image of the placed load with the first camera, and measuring a distance between the load and the first camera.

19. The method of claim 12, wherein the material handling vehicle further comprising a weight sensor configured to determine a weight of the load supported by the at least one fork, and wherein lowering the forks to place the load in the drop-off location further comprises determining, with the weight sensor, if the weight of the load supported by the at least one fork decreases.

* * * * *